June 18, 1957  E. L. C. STANFORD  2,796,233
STUMP PULLING DEVICE
Filed Sept. 10, 1954  4 Sheets-Sheet 1
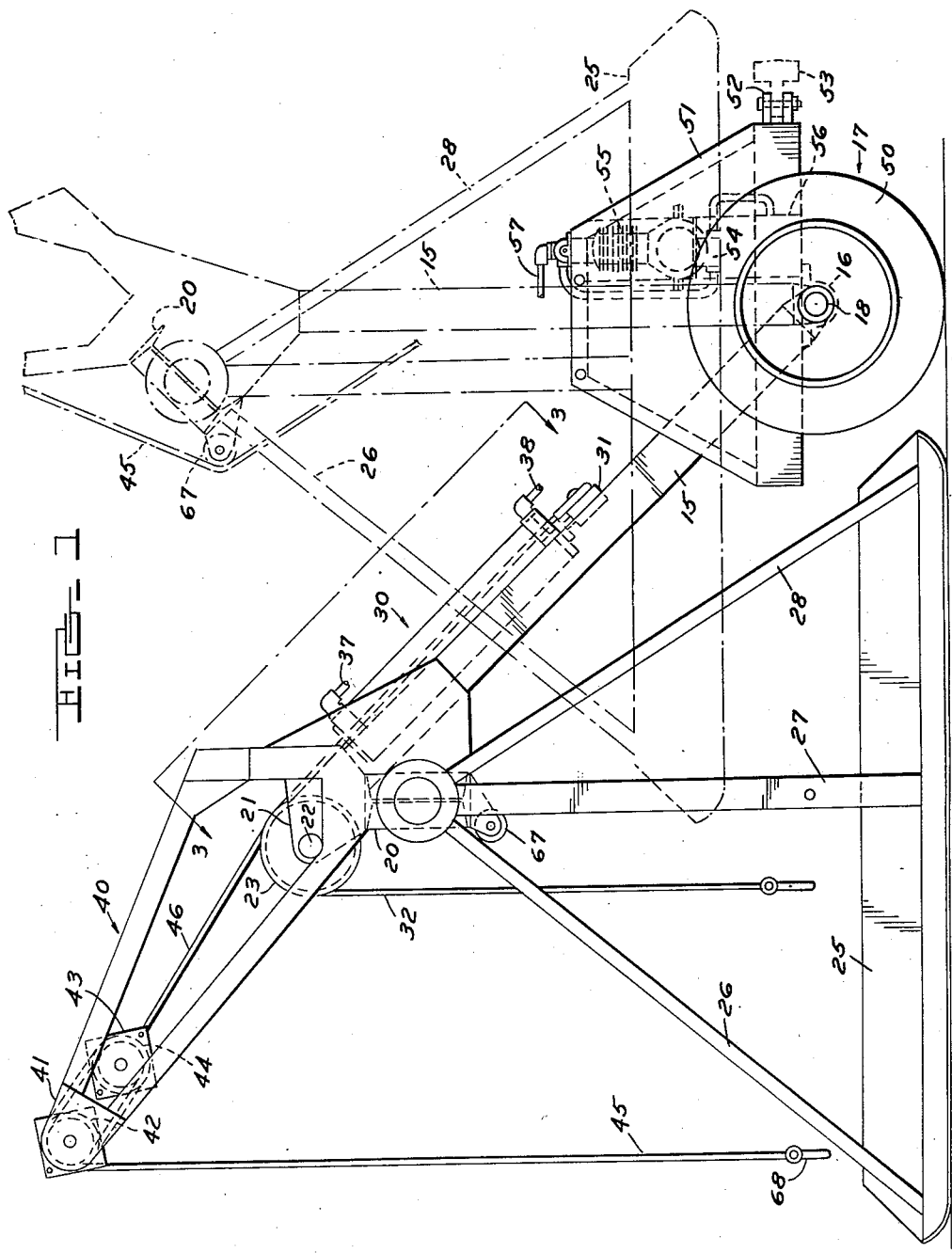
INVENTOR.
ERIC L. C. STANFORD
BY
Barnes, Kisselle, Laughlin & Raisch
ATTORNEYS

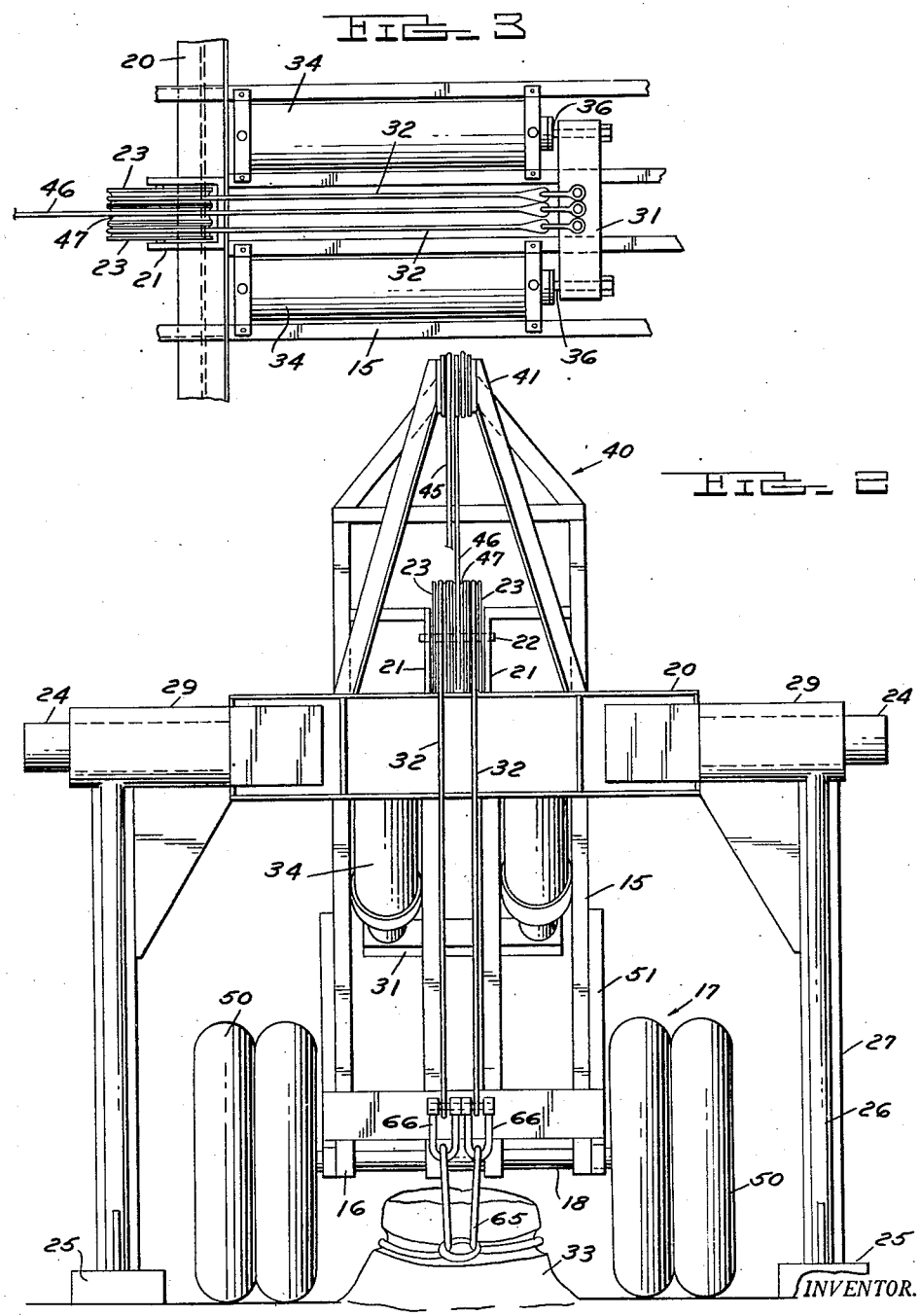

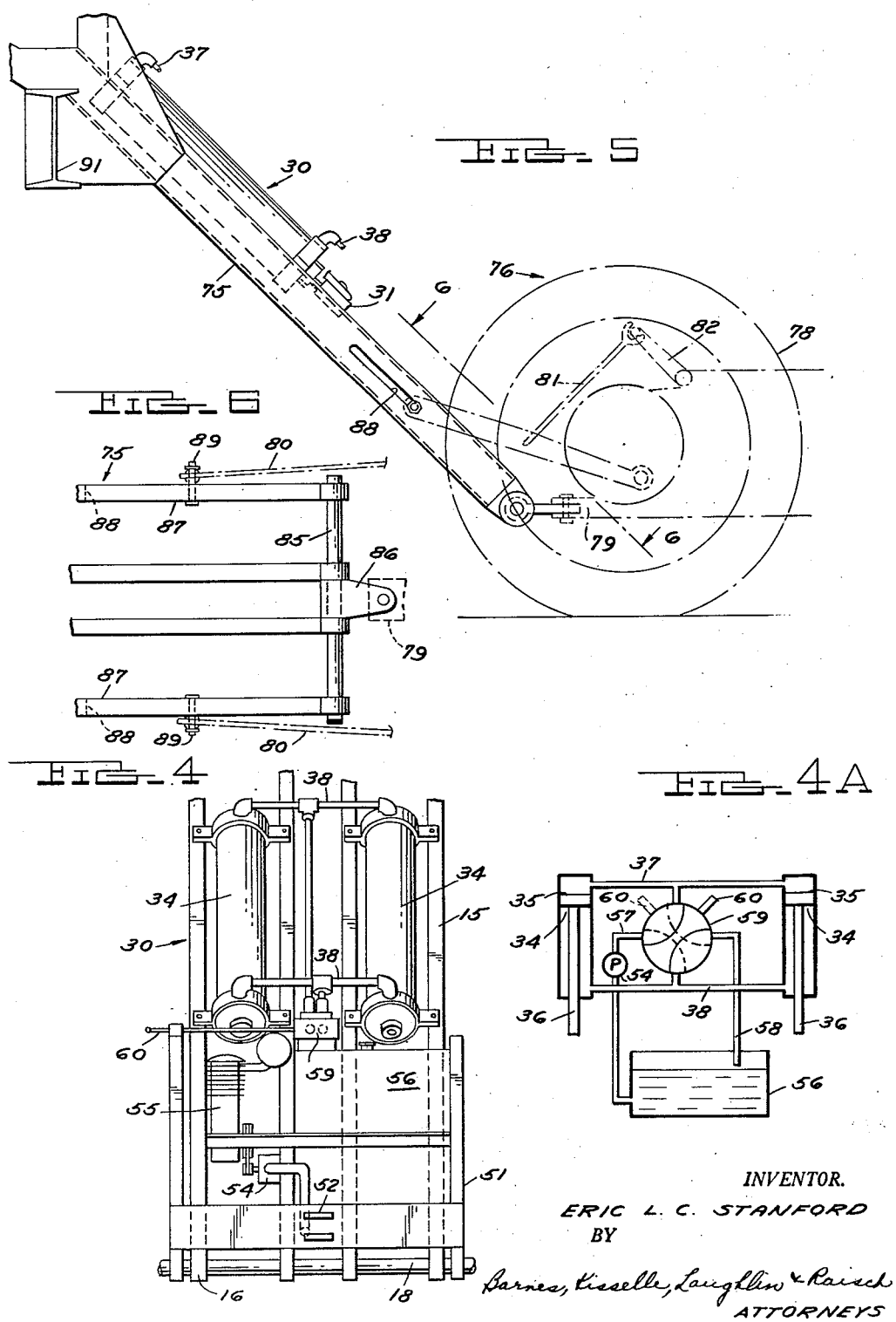

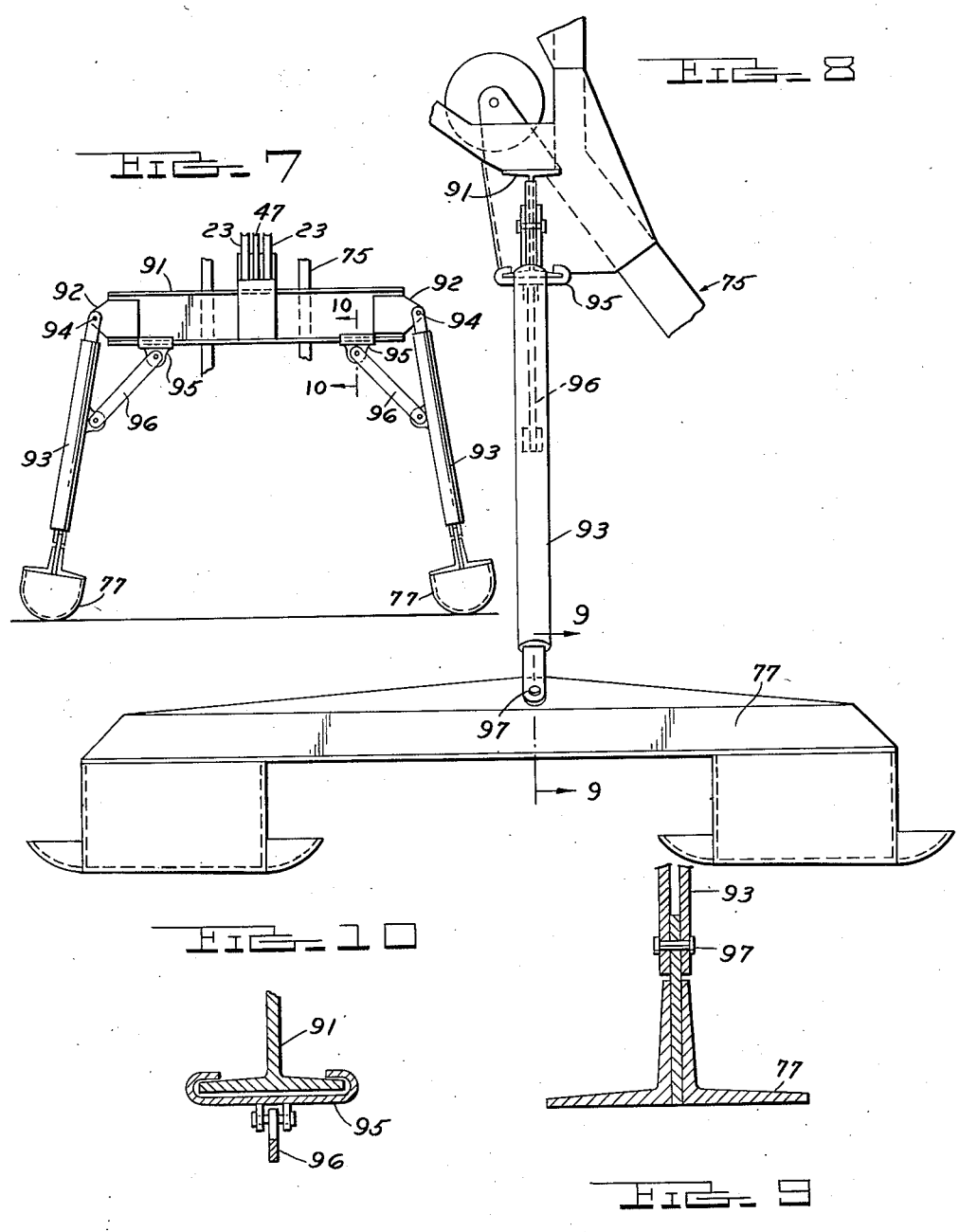

2,796,233
STUMP PULLING DEVICE

Eric L. C. Stanford, Port Huron, Mich.; Marie Taft Stanford, executrix of said Eric L. C. Stanford, deceased Application September 10, 1954, Serial No. 455,215

4 Claims. (Cl. 254—139.1)

This invention relates to a device for pulling firmly imbedded objects such as tree stumps and piles out of the earth.

An object of this invention is to provide a simple, inexpensive, mobile stump pulling device which can be easily maneuvered into operative position and which is easily transportable from one place to another. Another object of the invention is to provide handling means for a stump or the like after it has been pulled out of the ground.

The invention is carried out generally by means of a jib mounted for vertical swinging on a vehicle and having a beam supported in elevated position by ground engaging shoes when the jib is in operative position. A hydraulic motor acting through a cable and pulley on the beam provides the stump pulling force. A block and tackle on the jib and connected with the hydraulic motor in reverse arrangement provides hoist means for stumps and the like after they have been pulled from the ground. One form of the invention is shown in the accompanying drawings which may be briefly described as follows:

Fig. 1 is a partly diagrammatic side elevation of a stump pulling device according to this invention.

Fig. 2 is a partly diagrammatic front elevation of the device in operative position.

Fig. 3 is a view on line 3—3 of Fig. 1.

Fig. 4 is a partly diagrammatic view of the hydraulic motor and associated elements.

Fig. 4a is a diagram of the hydraulic system actuating the motor.

Fig. 5 is a partly diagrammatic elevational view illustrating a modified form of the invention mounted on a tractor.

Fig. 6 is a view on line 6—6 of Fig. 5.

Fig. 7 is a partly diagrammatic front elevational view illustrating the beam and supports of the modified form in operative position.

Fig. 8 is an enlarged fragmentary, partly diagrammatic side view illustrating a support for the beam in the modified form.

Fig. 9 is an enlarged sectional view on line 9—9 of Fig. 8.

Fig. 10 is an enlarged sectional view on line 10—10 of Fig. 7.

The device shown in Fig. 1 has a boom or jib 15 having one end portion 16 pivotally mounted on a wheeled carriage 17 for swinging in a vertical direction. End 16 may conveniently be pivoted on an axle 18 of the carriage as shown. A load carrying beam 20 is secured transversely of jib 15. Beam 20 carries supports 21 for a shaft 22 on which a plurality of pulleys 23 are journaled. Extending longitudinally from each end of beam 20 are cylindrical elements forming trunnions 24. Beam 20 and jib 15 are supported in operative position by ground engaging shoes 25 through an interconnecting system of struts 26, 27 and 28.

Each shoe 25 and its associated struts may advantageously have the form of an inverted single strut deck truss as illustrated in Fig. 1. Struts 26, 27 and 28 join in cylindrical sleeves 29 which fit pivotally around trunnions 24. Trunnions 24 and the truss structure and shoes 25 dependent therefrom lie outwardly of the outer extremity of carriage 17 as shown in Fig. 2. Hence, when jib 15 is elevated from the operative position shown in solid lines in Fig. 1 to the inoperative position shown in broken lines, shoes 25 and their associated struts will straddle carriage 17.

A hydraulic motor 30 mounted on the jib is connected through a movable crosshead 31 to grappling means which may include flexible traction elements 32 which engage over pulleys 23 and extend groundwardly in operative position for pulling a tree stump 33 or the like. Traction elements 32 preferably comprise standard commercially available wire cables. The hydraulic motor 30 comprises cylinders 34 with pistons 35 therein movable longitudinally of jib 15 and connected to crosshead 31 through piston rods 36. Hydraulic conduits 37 and 38 connect into the ends of the cylinders as shown.

Jib 15 has an extension 40 which extends upwardly of beam 20 in operative position. A block and tackle arrangement at the upper end 41 of the extension provides a hoist for stumps and the like which have been pulled out of the ground. The arrangement includes a stationary pulley 42, a movable block 43 having a plurality of pulleys 44 and a fall 45 which engages over pulley 42 and extends groundwardly for attachment to the pulled stump. Block 43 is connected to crosshead 31 by a cable 46 and preferably includes two pulleys 44 so that fall 45 travels substantially twice the distance of crosshead 31. Cable 46 preferably engages over a pulley 47 journaled on shaft 22, (Fig. 2).

Carriage 17 includes ground engaging wheels 50 which, through axle 18, supports a frame 51. The frame is provided with a hitch 52 for connection to the drawbar of a prime mover as represented at 53. The carriage carries a hydraulic pump 54 which may advantageously be driven by a small gasoline engine 55 and which pumps fluid from a reservoir 56 to hydraulic motor 30 through conduit 57. An exhaust conduit 58 returns the fluid from the cylinders to the reservoir. A four way valve 59 having an operating handle 60 is provided for actuating hydraulic motor 30.

In use, it may be assumed that the device is initially in the operative position illustrated in solid lines in Figs. 1 and 2. Ground engaging shoes 25 are resting on the ground astride a tree stump 33 with the truss structures thereon supporting beam 20 in a position generally vertically above the stump. The stump has been prepared for the pulling operation and a suitable sling 65 has been secured thereto. Cables 32 are secured to the sling by such means as clevises 66. At this time engine 55 is driving pump 54 to provide hydraulic pressure and the operating handle 60 of valve 59 is in the dotted line or retracting position shown in Fig. 4a so that pistons 35 are at the upper ends of cylinders 34 and crosshead 31 is in retracted position.

When operating handle 60 is shifted to the solid line or advancing position shown in Fig. 4a fluid under pressure is introduced into the upper ends of cylinder 34 through conduits 37. Pistons 35, piston rods 36 and crosshead 31 are forced downwardly so that cables 32 exert upward tractive force on the stump. Beam 20 absorbs the resulting load on pulley 23 and the beam in turn is supported by shoes 25 and associated truss structures. This force is maintained until stump 33 has been pulled from the ground. Extracting a tree stump from the ground may involve manual operations such as chopping away roots and the like. It is to be noted that the various elements of this device are so spaced that there is adequate room for easy access to areas around the stump for accomplishing these manual operations.

When the stump has been extracted from the ground, operating handle 60 may be returned to the retracting position shown in Fig. 4a so that pressure in the upper ends of the cylinders 34 is relieved and pressure is introduced into the lower ends of the cylinders through conduits 38. Pistons 35, piston rods 36 and crosshead 31 retract and cables 32 lower the stump to the ground. When pistons 35 retract, fluid in the upper regions of cylinders 34 exhausts through conduit 58 to reservoir 56.

Further handling of the pulled stump such as loading it on a truck may be accomplished by means of the hoist arrangement provided by the upper extension 40 of jib 15. Fall 45 is attached by suitable means to the stump and operating handle 60 on valve 59 is shifted to the advancing position. Crosshead 31 is thereby advanced downwardly as described and cable 46 secured to the crosshead shifts the double pulley block 43 away from stationary pulley 42. Fall 45 lifts the stump to a height which is twice the distance of travel or crosshead 31. The stump may then be lowered onto a truck bed by again returning operating handle 60 to the retracting position.

To move the device to a new location for pulling another stump, jib 15 is elevated to a generally vertical inoperative position as shown in broken lines in Fig. 1. For this purpose fall 45 may be engaged over a specially provided pulley 67 carried by beam 20 and the attaching element 68 on the fall may be secured by suitable means such as an auxiliary sling (not shown) to a portion of frame 51 of the carriage, preferably substantially above axle 18. Operating handle 60 is then shifted to the advancing position to actuate the hoist mechanism and elevate the jib to vertical position. The jib may be locked in vertical position by suitable locking pins (not shown). Engine 55 may then be stopped.

When the hoist is elevated to inoperative position, shoes 25 are raised out of contact with the ground to positions straddling and spaced from the carriage. The shoes retain their generally horizontal position by rotation of sleeves 29 around trunnions 24. Hitch 52 on the carriage may then be attached to the drawbar 53 of a prime mover and the entire unit may be moved in the manner of a trailer to a new location for pulling another stump or the like. When the carriage has been properly positioned with respect to the new stump, engine 55 is started to provide hydraulic pressure, jib 15 is unlocked from the frame, and operating handle 60 is shifted to the retracting position, thereby actuating the hoist to lower jib 15 to operative position with shoes 25 engaging the ground astride the new stump. Fall 45 may then be disconnected from frame 51. Traction cables 32 are dropped groundwardly during the lowering movement of the jib and are positioned for attachment to sling 65 without further maneuvering of the jib. The stump pulling operation may now be repeated as described above.

The modified form of the invention illustrated in Figs. 5 through 10 is similar to the principal form of the invention except that jib 75 is adapted to be removably mounted on a standard type tractor represented at 76 and ground engaging shoes 77 are arranged to be adjusted transversely of the jib. Tractor 76 has wheels 78, an implement hitch 79 and an implement elevating mechanism including arms 80 and actuating links 81 and 82 therefor.

Jib 75 has a lower end member 85 with an attachment element 86 pivoted thereon. Attachment element 86 is adapted to be mounted on implement hitch 79 of the tractor. Members 87 of jib 75 have elongate longitudinal slots 88 adapted to receive pins 89 secured to the implement elevating arms 80 on tractor 76. Hydraulic motor 30 carried by jib 75 has conduits 37 and 38 adapted for connection to a source of hydraulic pressure on the tractor.

Beam 91 carried by jib 75 supports pulleys 23 and 47 as in the principal form of the invention. Beam ends 92 project outwardly of the outer extremities of tractor 76. Legs 93 are pivoted on the outer ends 92 of the beam as at 94 so that the legs and ground engaging shoes 77 secured thereto may be adjusted inwardly and outwardly. Beam 81 has elements 95 slidable thereon and braces 96 are pivotally secured between slides 95 and legs 93 (Fig. 7). The lower ends of legs 93 are pivotally secured to shoes 77 as indicated at 97 to permit beam 91 to shift longitudinally of the shoes.

Operation of this form of the invention is similar to operation of the principal form. In operative position ground engaging shoes 77 are astride a stump with beam 91 generally vertically above the stump. Hydraulic pump and valve means on tractor 76 are utilized to actuate hydraulic motor 30 for pulling and hoisting the stump. To move the device from one location to another jib 75 is elevated to inoperative position by the implement elevating device on the tractor: arms 80 are swung upwardly by actuating links 81 and 82 and pins 89 on arms 80 engaging in slots 88 swing the jib upwardly. Legs 93 swing from their vertical position toward a horizontal position. Shoes 77 remain generally horizontal by reason of their pivotal connections 97 to legs 93. Legs 93 may be supported in inoperative position by such means as detachable braces (not shown) connected to jib 75.

The device is placed in operative position with respect to a stump by lowering arms 80 and jib 75 with shoes 77 astride a stump. The shoes may be adjusted outwardly as shown to provide maximum working space around the stump. The shoes and legs 93 may be locked in adjusted position by suitable means such as drop pins projecting through openings in beam 91 and slides 95 (not shown). When the jib is elevated to inoperative position, shoes 77 may be adjusted inwardly so that the over-all width of the device will remain within the usual eight feet maximum width permitted for vehicles used on public highways.

I claim:

1. A device for pulling tree stumps and the like out of the earth comprising, a movable carriage, a jib, means mounting the jib for vertical swinging on said carriage, a transverse beam on said jib, said beam having opposite end portions projecting outwardly of said carriage, ground engaging shoe means mounted on said end portions of said beam for swinging relatively to said jib in a vertical plane substantially parallel to the plane in which said jib swings, so that said shoe means can be lowered to a ground engaging operative position and elevated to a retracted position, said shoe means supporting said beam in operative position, said shoe means straddling said carriage when elevated to retracted position, motor means, grappling means supported by said beam, said grappling means being movable in a generally vertical direction relatively to said beam responsively to operation of said motor means for pulling an article out of the ground.

2. A device for pulling tree stumps and the like out of the earth comprising, means forming a jib adapted to be mounted for generally vertical swinging on a vehicle, load-bearing means on said jib, said load-bearing means extending laterally in opposite directions from said jib so that the ends thereof project outwardly of a vehicle on which said jib is adapted to be mounted, depending elements mounted on said end portions of said load-bearing means for swinging relatively to said jib in a generally vertical plane substantially parallel to the plane in which said jib swings on a vehicle, so that said depending elements can be lowered to an operative position and elevated to a retracted position, said depending elements supporting said load-bearing means in operative position, said depending elements straddling a vehicle on which said device is adapted to be mounted when elevated to retracted position, motor means, grappling means supported by said load-bearing means, said grappling means being movable in a generally vertical direction relatively to said load-bearing means responsively to operation of said motor means for pulling an article out of the ground.

3. A device for pulling tree stumps and the like out of the earth comprising, a movable vehicle, means forming a jib, means mounting said jib for vertical swinging on said vehicle, load-bearing means on said jib, said load-bearing means extending laterally in opposite directions from said jib so that the ends thereof project outwardly of said vehicle, depending elements mounted on said end portions of said load-bearing means for swinging relatively to said jib in a vertical plane substantially parallel to the plane in which said jib swings on said vehicle, so that said depending elements can be lowered to an operative position and elevated to a retracted position, said depending elements supporting said load-bearing means in operative position, said depending elements straddling said vehicle when elevated to retracted position, motor means, grappling means supported by said load-bearing means, said grappling means being movable in a generally vertical direction relatively to said load-bearing means responsively to operation of said motor means for pulling an article out of the ground.

4. A device for pulling tree stumps and the like out of the earth comprising, a jib adapted to be mounted for vertical swinging on a vehicle, a transverse beam on said jib, said beam having opposite end portions projecting outwardly of a vehicle on which said jib is adapted to be mounted, ground engaging shoe means mounted on said end portions of said beam for swinging relatively to said jib in a vertical plane substantially parallel to the plane in which said jib swings, so that said shoe means can be lowered to a ground engaging operative position and elevated to a retracted position, said shoe means supporting said beam in operative position, said shoe means straddling the vehicle when elevated to retracted position, motor means, grappling means supported by said beam, said grappling means being movable in a generally vertical direction relatively to said beam responsively to operation of said motor means for pulling an article out of the ground.

References Cited in the file of this patent

UNITED STATES PATENTS

| | | |
|---|---|---|
| 453,051 | Smeal | May 26, 1891 |
| 1,188,760 | Hagenbucher | June 27, 1916 |
| 1,981,308 | Copley | Nov. 20, 1934 |
| 2,597,740 | Lyle III | May 20, 1952 |